United States Patent
Shimizu et al.

(10) Patent No.: US 7,033,684 B2
(45) Date of Patent: Apr. 25, 2006

(54) MAGNETIC RECORDING MEDIUM, METHOD OF MANUFACTURE THEREOF, AND MAGNETIC READ/WRITE APPARATUS

(75) Inventors: Kenji Shimizu, Ichihara (JP); Akira Sakawaki, Ichihara (JP); Hiroshi Sakai, Ichihara (JP); Takashi Hikosaka, Tokyo (JP); Soichi Oikawa, Chiba (JP)

(73) Assignees: Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 66 days.

(21) Appl. No.: 10/617,868

(22) Filed: Jul. 14, 2003

(65) Prior Publication Data

US 2004/0013909 A1     Jan. 22, 2004

Related U.S. Application Data

(60) Provisional application No. 60/399,139, filed on Jul. 30, 2002.

(30) Foreign Application Priority Data

Jul. 16, 2002  (JP) .............................. 2002-207306

(51) Int. Cl.
G11B 5/66 (2006.01)
G11B 5/70 (2006.01)

(52) U.S. Cl. ..................................... 428/828; 427/131
(58) Field of Classification Search .......... 428/694 TS, 428/694 TM, 336, 611, 900, 828, 831; 427/131
See application file for complete search history.

(56) References Cited

U.S. PATENT DOCUMENTS

| | | | |
|---|---|---|---|
| 5,815,342 A * | 9/1998 | Akiyama et al. | ........ 360/97.01 |
| 6,403,203 B1 * | 7/2001 | Futamoto et al. | ........... 428/212 |
| 6,524,724 B1 | 2/2003 | Cheng et al. | |
| 6,537,638 B1 | 3/2003 | Do et al. | |
| 6,670,055 B1 | 12/2003 | Tomiyasu et al. | |
| 6,686,070 B1 | 2/2004 | Futamoto et al. | |
| 6,723,457 B1 | 4/2004 | Tanahashi et al. | |
| 2004/0023074 A1 | 2/2004 | Shimizu et al. | |

* cited by examiner

*Primary Examiner*—Holly Rickman
(74) *Attorney, Agent, or Firm*—Sughrue Mion, PLLC (57) ABSTRACT

A magnetic recording medium comprising at least a soft magnetic layer, an orientation control film that controls the orientation of a film provided directly thereabove, an intermediate film, a perpendicular magnetic recording film of which the axis of easy magnetization is generally oriented perpendicular to a non-magnetic substrate, and a protective film, that are provided on said substrate, wherein the intermediate film has saturation magnetization Ms of at least 20 (emu/cc) and equal to or less than 200 (emu/cc), a method of manufacture thereof, and a magnetic read/write apparatus.

22 Claims, 3 Drawing Sheets

MAGNETIC RECORDING MEDIUM, METHOD OF MANUFACTURE THEREOF, AND MAGNETIC READ/WRITE APPARATUS

CROSS-REFERENCE TO RELATED APPLICATION

This application claims the benefit pursuant to 35 U.S.C. §119(e)(1) of U.S. Provisional Application, No. 60/399,139 filed on Jul. 30, 2002.

BACKGROUND OF THE INVENTION

1. Field of the invention

The present invention relates to a magnetic recording medium, a method of manufacture thereof, and a magnetic read/write apparatus that uses the magnetic recording medium.

2. Description of the Related Art

In a conventional in-plane magnetic recording medium, there arises a problem that thermal fluctuation occurs when high recording density is realized by refining recording bits.

To solve this problem, a perpendicular magnetic recording system having perpendicular magnetic anisotropy has recently been proposed.

However, even when the soft back layer is provided, the magnetic recording medium does not have satisfactory performance in read/write characteristics, thermal demagnetization resistance and the resolution of recording, and therefore a magnetic recording medium that is better in these characteristics has been required.

A known technique proposes that crystal grains be refined by the addition of Ta or B to the composition CoCr of the intermediate layer, thereby improving read/write characteristics. However, when using a non-magnetic material, the thermal stability cannot be sufficiently improved.

BRIEF SUMMARY OF THE INVENTION

Under the above-described circumstances, the present invention has been made, and an object thereof is to provide a magnetic recording medium that is capable of recording and reading back information at a higher density by improving read/write characteristics and thermal stability, a method of manufacture thereof, and a magnetic read/write apparatus.

To achieve the objects described above, the present invention employed the following constructions.

The magnetic recording medium of the present invention comprises at least a soft magnetic layer, an orientation control film that controls the orientation of a film provided directly thereabove, an intermediate film, a perpendicular magnetic recording film, of which the axis of easy magnetization is generally oriented perpendicular to a non-magnetic substrate, and a protective film, that are provided on said substrate, wherein the intermediate film is made of a Co alloy and has saturation magnetization (Ms) of at least 20 (emu/cc) and equal to or less than 200 (emu/cc).

In the magnetic recording medium of the present invention, saturation magnetization Ms of the intermediate film is preferably at least 50 (emu/cc) and equal to or less than 150 (emu/cc).

In the magnetic recording medium of the present invention, the thickness of the intermediate film is preferably at least 2 nm and equal to or less than 30 nm.

In the magnetic recording medium of the present invention, the intermediate film is preferably made of CoCrPtB.

In the magnetic recording medium of the present invention, the total of a Cr content and a B content of the intermediate film is preferably at least 23 at % and equal to or less than 35 at %.

The Cr content of the intermediate film is preferably at least 20 at % and equal to or less than 34 at %.

In the magnetic recording medium of the present invention, the thickness of an amorphous structure, as the initial growth portion of the intermediate film, is preferably equal to or less than 1 nm.

In the magnetic recording medium of the present invention, it is possible to employ a construction in which the orientation control film has an amorphous structure.

In the magnetic recording medium of the present invention, it is possible to employ a construction in which the orientation control film has a fine crystal structure of a mean grain diameter of equal to or less than 3 nm.

Next, the method of manufacturing a magnetic recording medium of the present invention comprises forming at least a soft magnetic layer, an orientation control film that controls the orientation of a film provided directly thereabove, an intermediate film, a perpendicular magnetic recording film of which the axis of easy magnetization is generally oriented perpendicular to a non-magnetic substrate, and a protective film, on the substrate, while controlling so that the intermediate film is made of a Co alloy and saturation magnetization Ms of the intermediate film is at least 20 (emu/cc) and equal to or less than 200 (emu/cc).

Next, the magnetic read/write apparatus comprises the above-described magnetic recording medium of the present invention and a single pole type head that records information on the magnetic recording medium and reads the information.

As described above, in the magnetic recording medium of the present invention, at least a soft magnetic layer, an orientation control film that controls the orientation of a film provided directly thereabove, an intermediate film, a perpendicular magnetic recording film of which the axis of easy magnetization is generally oriented perpendicular to a non-magnetic substrate, and a protective film are provided on the substrate, and the intermediate film is made of a Co alloy and has saturation magnetization (Ms) of at least 20 (emu/cc) and equal to or less than 200 (emu/cc). Therefore, both of read/write characteristics and thermal stability can be improved.

DETAILED DESCRIPTION OF THE INVENTION

The embodiments of the present invention will be described below with reference to the accompanying drawings.

FIRST EMBODIMENT

Figure 1:
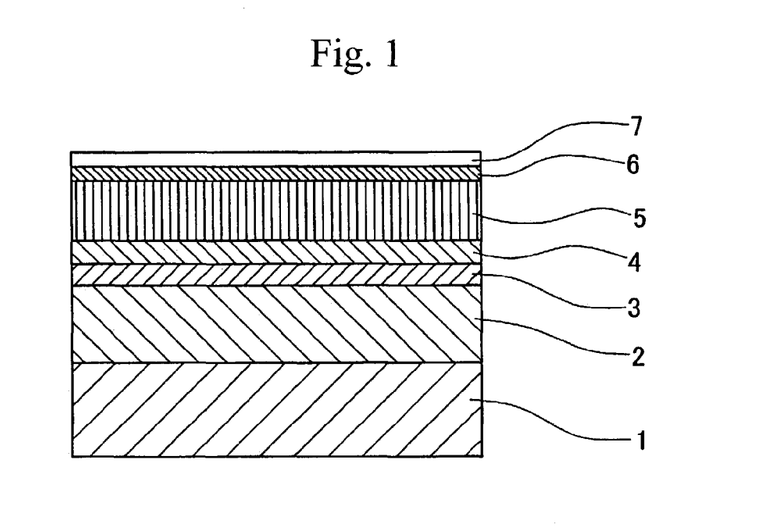
FIG. 1 is a partially sectional view showing the first embodiment of a magnetic recording medium of the present invention.

FIG. 1 shows the first embodiment of the present invention. The magnetic recording medium shown here has a structure in which a soft magnetic layer 2, an orientation control film 3, an intermediate film 4, a perpendicular magnetic recording film 5, a protective film 6 and a lubrication film 7 are formed on a non-magnetic substrate 1.

As the non-magnetic substrate 1, a metallic substrate comprising a metallic material such as aluminum or aluminum alloy may be used, and a non-metallic substrate comprising a non-metallic material such as glass, ceramic, silicon, silicon carbide or carbon may be used.

Examples of the glass substrate include amorphous glass substrate and crystallized glass substrate. As the amorphous glass, general-purpose soda-lime glass, aluminate glass and aluminosilicate glass can be used. As the crystallized glass, lithium-based crystallized glass can be used. As the ceramic substrate, a sintered body containing general-purpose aluminum oxide, aluminum nitride or silicon nitride as the major constituent, or fiber-reinforced products thereof can be used.

As the non-magnetic substrate 1, there can also be used substrates wherein the NiP film is formed on these substrates by a plating method, a sputtering method, or the like.

The soft magnetic layer 2 is provided in order to increase the component perpendicular to the substrate of the magnetic flux from the head and to establish more firmly the magnetization of the perpendicular magnetic recording film 5, that records the information, in a direction perpendicular to the substrate 1. This action becomes more prominent when using a single pole type head for perpendicular recording as a read/write magnetic head.

The soft magnetic layer 2 is made of a soft magnetic material. As the material thereof, a material containing Fe, Ni and Co can be used.

Examples of the material of the soft magnetic layer 2 include FeCo alloys (FeCo, FeCoB, FeCoV and the like), FeNi alloys (FeNi, FeNiMo, FeNiCt, FeNiSi and the like), FeAl alloys (FeAl, FeAlSi, FeAlSiCr, FeAlSiTiRu, FeAlO and the like), FeCr alloys (FeCr, FeCrTi, FeCrCu and the like), FeTa alloys (FeTa, FeTaC, FeTaN and the like), FeMg alloys (FeMgO and the like), FeZr alloys (FeZrN and the like), FeC alloys, FeN alloys, FeSi alloys, FeP alloys, FeNb alloys, FeHf alloys, and FeB alloys.

There can also be used a material having an Fe content that is at least 60 at % composed of microcrystals comprising FeAlO, FeMgO, FeTaN, FeZrN or the like. In addition, it can also have a granular structure in which the microcrystals are dispersed in a matrix.

As the material of the soft magnetic layer 2, a Co alloy, which contains at least 80 at % of Co and also contains at least one or more of Zr, Nb, Ta, Cr, Mo or the like, can be used.

For example, CoZr, CoZrNb, CoZrTa, CoZrCr, and CoZrMo alloys can be used advantageously as the material.

The coercive force Hc of the soft magnetic layer 2 is preferably equal to or less than 100 (Oe) (preferably equal to or less than 20 (Oe)).

The coercive force Hc of greater than the above range is not preferable by the following reason. That is, soft magnetic characteristics become insufficient and the read back wave is not a so-called rectangular wave, but a distorted wave.

Bs·t (T·nm), that is, the product of the saturation magnetic density Bs (T) of the material that forms the soft magnetic layer 2 and the thickness t (nm) of the soft magnetic layer 2, is preferably at least 50 (T·nm) (more preferably at least 80 (T·nm)). A Bs·t that is less than the above range is not preferable for the following reasons. That is, the read back wave is sometimes distorted and OW characteristics deteriorate.

It is preferable that the outermost surface of the soft magnetic layer 2 (the plane of the orientation control film 3 side) that forms the soft magnetic layer 2 be partially or completely oxidized. That is, on the surface (the plane of the orientation control film 3 side) of the soft magnetic layer 2 or in the vicinity thereof, the material constituting the soft magnetic layer 2 is partially oxidized, or an oxide of the material is preferably formed.

Consequently, magnetic fluctuation of the surface of the soft magnetic layer 2 can be suppressed and, therefore, read/write characteristics of the magnetic recording medium can be improved by reducing noise caused by the magnetic fluctuation.

Also read/write characteristics can be improved by refining crystal grains of the orientation control film 3 formed on the soft magnetic layer 2.

The oxidized portion of the surface of the soft magnetic layer 2 can be formed by a method in which the soft magnetic layer 2 is exposed to a gas that includes oxygen after forming the soft magnetic layer 2, or a method that introduces oxygen into the process gas when forming the portion of the film at the surface of the soft magnetic layer 2 can be used. Specifically, in the case in which the surface of the soft magnetic layer 2 is exposed to an oxygen-containing atmosphere, it may be allowed to stand in oxygen alone, or a gas atmosphere obtained by diluting oxygen with argon or nitrogen for about 0.3 to 20 seconds. Also the method of exposing the soft magnetic layer 2 to atmospheric air can be employed. In particular, when using a gas obtained by diluting oxygen with argon or nitrogen, stable manufacture can be conducted because it becomes easy to control the degree of oxidization of the surface of the soft magnetic layer 2. In the case in which oxygen is introduced into a film-forming gas of the soft magnetic layer 2, for example, when using a sputtering method as the film-forming method, sputtering may be conducted using a process gas containing oxygen introduced therein during only a portion of the film-forming time. As the process gas, for example, a gas obtained by mixing argon with about 0.05% to 50% (preferably 0.1 to 20%) of oxygen is preferably used.

The orientation control film 3 is a film provided for controlling the orientation and crystal grain diameter of the intermediate film 4 and the perpendicular magnetic recording film 5 provided directly thereabove.

The crystal structure of the orientation control film 3 is preferably an amorphous structure, or a fine crystal structure of a mean grain diameter equal to or less than 3 nm. The initial growth portion of the intermediate film 4 can be controlled to 1 nm or less by the orientation control film 3 having an amorphous structure or a fine crystal structure.

With respect to the thickness of the initial growth portion of the intermediate film 4, the sectional portion is observed by TEM (transmission electron microscopy) and the portion in which the presence of a crystal is not confirmed by the TEM image is defined as an amorphous portion.

The material of the orientation control film 3 includes, for example, Co alloy, Ni alloy and Fe alloy. In particular, an alloy of Co and Fe as well as Ta, W and Mo is preferred.

The thickness of the orientation control film 3 is preferably from 0.5 to 20 nm (more preferably from 1 to 10 nm). When the thickness of the orientation control film 3 is from 0.5 to 20 nm (preferably from 1 to 10 nm), the perpendicular orientation of the perpendicular magnetic recording film 5 becomes particularly higher and the distance between the magnetic head and the soft magnetic layer 2 becomes large during read back, and therefore read/write characteristics can be enhanced without deteriorating the resolution of the read back signal.

When the thickness falls below the above range, the perpendicular orientation of the perpendicular magnetic recording film 5 is reduced, and therefore read/write characteristics and the thermal stability deteriorate.

Also, when the thickness exceeds the range described above, the magnetic grain size of the perpendicular magnetic recording film 5 increases and the noise characteristics deteriorate, which is not preferable. Since the distance between the magnetic head and the soft magnetic layer 2 becomes large during read back, the resolution of the read back signal decreases and the noise characteristics deteriorate, which is not preferable.

Oxygen or nitrogen may be introduced into a gas for formation of the orientation control film 3 for the purpose of refining the perpendicular magnetic recording film provided thereon. For example, when using a sputtering method as the film-forming method, a gas obtained by mixing argon with about 0.05% to 50% (preferably 0.1 to 20%) of oxygen or a gas obtained by mixing argon with about 0.01% to 20% (preferably 0.02 to 10%) of nitrogen is preferably used as the film-forming gas.

It is preferable that the intermediate film 4 be made of a Co alloy and has saturation magnetization (Ms) that is at least 20 (emu/cc) and equal to or less than 200 (emu/cc). More preferably, Ms is at least 50 (emu/cc) and equal to or less than 150 (emu/cc).

It is preferable to use, as the material of the intermediate layer 4, a CoCr alloy, a CoCrX$_1$ alloy or a CoX$_1$ alloy (X$_1$: one or more kinds of elements selected from Pt, Ta, Zr, Ru, Nb, Cu, Re, Ni, Mn, Ge, Si, O, N and B).

More preferably, the intermediate film is made of CoCrPtB. With respect to the composition of CoCrPtB, the total of a Cr content and a B content is preferably at least 23 at % and equal to or less than 35 at %. The total content of a Cr content and a B content is preferably at least 20 at % and equal to or less than 34 at %.

The Cr content is preferably at least 20 at % and equal to or less than 34 at %.

Ms of less than 20 (emu/cc) of the intermediate film 4 is not preferable because the effect of improving thermal fluctuation is not obtained.

Ms of greater than 200 (emu/cc) of the intermediate film 4 is not preferable because noise increases and read/write characteristics deteriorate.

The thickness of the intermediate layer 4 is preferably set to at least 2 nm and 30 nm or less (preferably at least 3 nm and 20 nm or less) in order to prevent deterioration of read/write characteristics due to coarsening of magnetic grains in the perpendicular magnetic recording film 5 and reduction of the resolution of recording due to an increase in distance between the magnetic head and the soft magnetic layer 2.

A thickness of less than 2 nm of the intermediate layer 4 is not preferable because sufficient effect of improving thermal fluctuation is not exhibited. A thickness of greater than 30 nm of the intermediate layer 4 is not preferable because a squareness ratio RS decreases and read/write characteristics deteriorate due to coarsening of magnetic grains in the perpendicular magnetic recording film.

The thickness of the initial growth portion of the intermediate film 4 is preferably equal to or less than 1 nm.

With respect to the thickness of the initial growth portion of the intermediate film 4, the sectional portion of the magnetic recording medium is observed by TEM and the portion in which the presence of a crystal is not confirmed by the resulting TEM image is defined as an amorphous portion.

In particular, the thickness of the initial growth portion of the intermediate film 4 can be controlled to 1 nm or less by the orientation control film 3 having an amorphous structure or a fine crystal structure.

The perpendicular magnetic recording film 5 is a film of which axis of easy magnetization is generally oriented perpendicular to the substrate 1, and preferably has the composition containing at least Co and Pt and also has an Ms of at least 250 (emu/cc). An Ms of less than 250 (emu/c) is not preferable because the ratio of residual magnetization (Mr) to saturation magnetization (Ms), Mr/Ms, is reduced.

Particularly preferably, the perpendicular magnetic recording film is made of a material containing Co, Cr and Pt and also has a Cr content that is at least 14 at % and equal to or less than 24 at % (preferably at least 16 at % and equal to or less than 22 at %) and a P content that is at least 14 at % and equal to or less than 24 at % (preferably at least 15 at % and equal to or less than 20 at %).

It is preferable to further add B in a content of at least 0.1 at % and equal to or less than 5 at %. Consequently, the grain diameter of the magnetic crystal grains can be reduced and it becomes possible to improve read/write characteristics.

The Cr content of less than 14 at % is not preferable for the following reason. That is, since exchange coupling between magnetic grains increases, the magnetic cluster size increases and noise increases. The Cr content of greater than 24 at % is not preferable because the ratio of residual magnetization (Mr) to saturation magnetization (Ms), Mr/Ms, is reduced.

A Pt content of less than 14 at % is not preferable because the ratio of residual magnetization (Mr) to saturation magnetization (Ms), Mr/Ms, is reduced and the thermal stability deteriorates. A Pt content of greater than 24 at % is not preferable because noise increases.

In a CoPt alloy, optional elements can be added, in addition to Cr and B. Examples thereof include, but are not specifically limited to, Ta, Mo, Nb, Hf, Ir, Cu, Ru, Zr, W and Nd.

The perpendicular magnetic recording film 5 can have a multiple layer structure comprising a layer of Co alloys (CoCr, CoB, Co—SiO$_2$ and the like) and a layer of Pd alloys (PdB, Pd—SiO$_2$ and the like), in addition to CoPt alloys.

The thickness of the perpendicular magnetic recording film 5 is preferably set from 5 to 50 nm (preferably from 10 to 40 nm). When the thickness of the perpendicular magnetic recording film 5 falls below the above range, the read back output deteriorate. A thickness of greater than the above range of the perpendicular magnetic recording film 5 is not preferable because magnetic grains in the perpendicular magnetic recording film 5 become coarse and read/write characteristics deteriorate.

The coercive force of the perpendicular magnetic recording film is preferably set to at least 2500 (Oe). The magnetic recording medium having the coercive force of less than 2500 (Oe) is not preferable because it is not suited to increasing the recording density and is also inferior in thermal stability.

The ratio of residual magnetization (Mr) to saturation magnetization (Ms), Mr/Ms, of the perpendicular magnetic recording film is set to at least 0.9. The magnetic recording medium having Mr/Ms of less than 0.9 is not preferable because it is inferior in thermal stability.

The negative nucleation field (−Hn) of the perpendicular magnetic recording film is preferably at least 0. The magnetic recording medium having the negative nucleation field (−Hn) of less than 0 is not preferable because of poor thermal stability.

Figure 2:
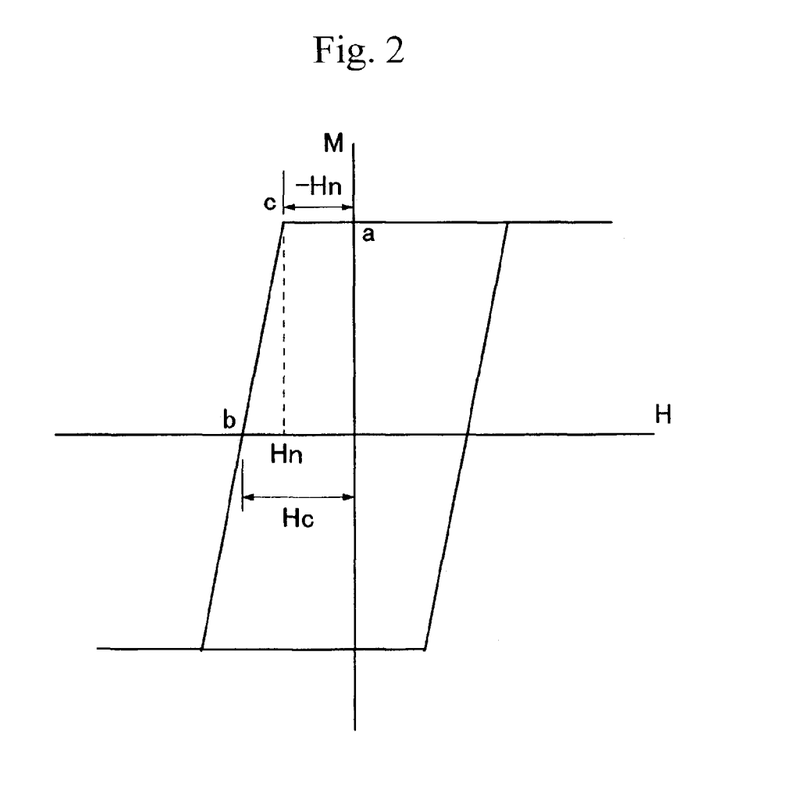
FIG. 2 is a graph showing an example of negative nucleation field (−Hn).

As shown in FIG. 2, the negative nucleation field (−Hn) is the numerical value represented by the distance (Oe) between the point "a" and the point "c" in a MH curve, where the point "a" is a point at which the external magnetic field becomes 0 in the process of decreasing the external magnetic field from a saturated state of the magnetization, the point "b" is a point at which the magnetization becomes 0, and the point "c" is a point of intersection of a tangent which touches the MH curve at the point "a" and a line which shows saturation magnetization.

Figure 3:
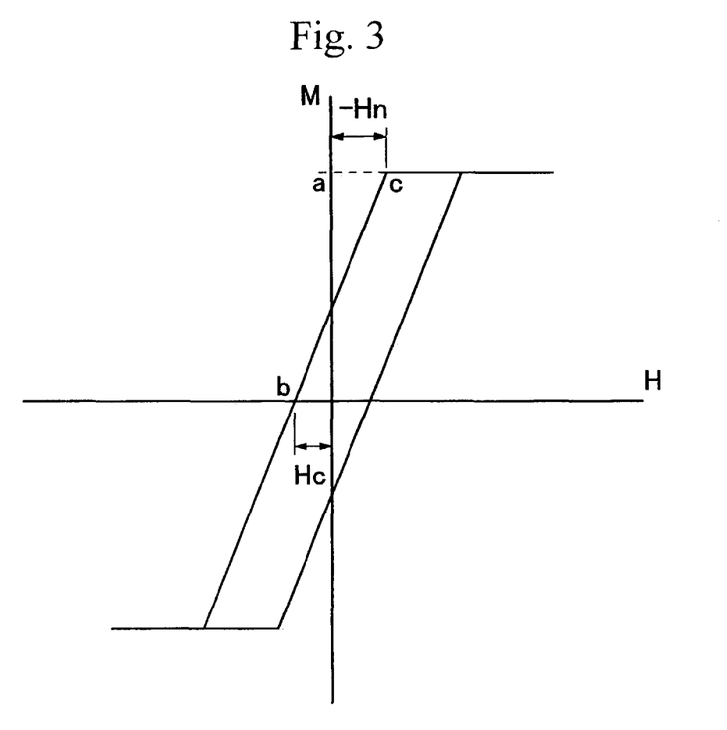
FIG. 3 is a graph showing another example of negative nucleation field (−Hn).

Moreover, the negative nucleation field (−Hn) takes a positive value in the case in which the point "c" is in a region in which the external magnetic field becomes negative as shown in FIG. 2, and conversely, takes a negative value in the case in which the point "c" is in a region in which the external magnetic field becomes positive as shown in FIG. 3.

In the perpendicular magnetic recording film 5, the mean grain diameter of crystal grains is preferably from 5 to 15 nm.

The mean grain diameter can be determined, for example, by observing crystal grains of the perpendicular magnetic recording film 5 by transmission electron microscopy (TEM) and image-processing the image observed.

$\Delta Hc/Hc$ of the perpendicular magnetic recording film 5 is preferably equal to or less than 0.3.

Figure 4:
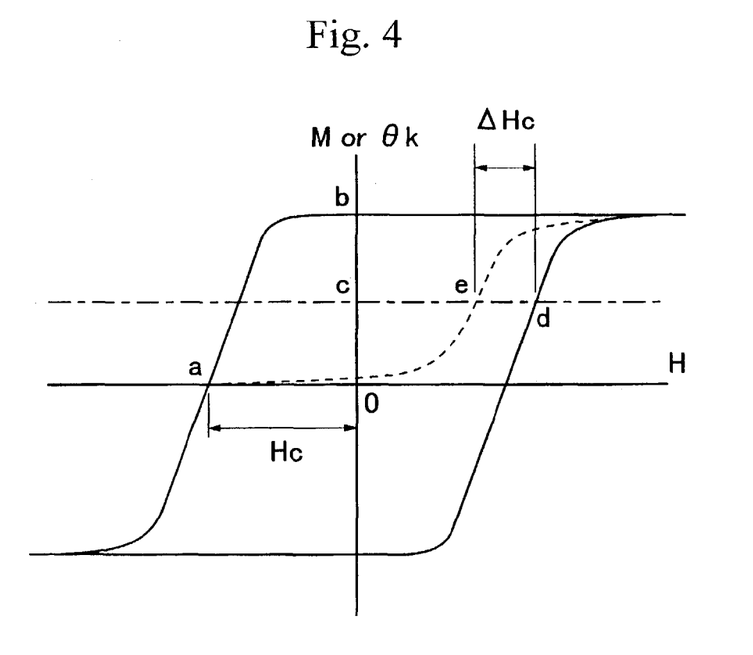
FIG. 4 is a graph showing another example of ΔHc/Hc.

As shown in FIG. 4, in the MH curve, $\Delta Hc$ is a difference of a magnetic intensity in Ms/2 between the major curve from negative maximum residual magnetization −Ms and the minor curve from a negative coersive force −Hc. $\Delta Hc/Hc$ of greater than 0.3 is not preferable because the grain diameter drastically varies and the perpendicular orientation deteriorates, and thus read/write characteristics and thermal stability deteriorate.

The protective film 6 is for preventing corrosion of the perpendicular magnetic recording film, and at the same time, prevents damage to the medium surface when the magnetic head comes into contact with the medium. Conventionally well-known materials can be used and, for example, a material containing C, $SiO_2$, or $ZrO_2$ can be used.

The thickness of the protective film 6 is preferably from 1 to 10 nm.

It is preferable to use, as a lubricant 7, perfluoropolyether, fluorinated alcohol, fluorinated carboxylic acid, or the like.

In the manufacture of the magnetic recording medium having the construction described above, a soft magnetic layer 2, an orientation control film 3, an intermediate film 4 and a perpendicular magnetic recording film 5 are formed in sequence on a substrate 1 by a sputtering method, vacuum deposition, ion plating or the like. Next, the protective film 6 is preferably formed by a plasma CVD method, an ion beam method, a sputtering method or the like.

To form a lubricant 7, conventionally well-known methods such as dip coating method and spin coating method can be employed.

In the magnetic recording medium having the above-described construction of the present invention, both of read/write characteristics and thermal stability can be improved by setting saturation magnetization Ms of the intermediate film to at least 20 (emu/cc) and equal to or less than 200 (emu/cc). The present inventors verified in the Examples described hereinafter that a noticeable effect can be obtained by controlling Ms of the intermediate film in the above range, and the details will be described in the Examples.

The thermal stability refers to a phenomenon wherein recording bits become unstable and thermal missing of recorded data occurs. In the magnetic recording medium apparatus, it appears as damping over time of the read back output of recorded data.

Figure 5:
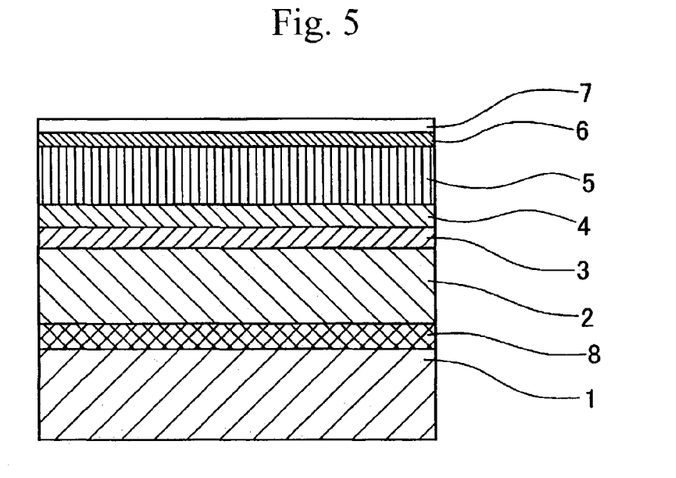
FIG. 5 is a partially sectional view showing the second embodiment of a magnetic recording medium of the present invention.

FIG. 5 shows the second embodiment of the magnetic recording medium of the present invention and is a sectional view showing a construction in which a permanent magnet film 8, of which magnetization anisotropy is mainly oriented in an in-planar direction, made of a hard magnetic material is provided between a non-magnetic substrate 1 and a soft magnetic layer 2.

It is preferable to use, in the permanent magnet film 8, a CoSm alloy or a $CoCrX_2$ alloy ($X_2$: one or more kinds of elements selected from Pt, Ta, Zr, Nb, Cu, Re, Ni, Mn, Ge, Si, O, N and B).

The coercive force Hc of the permanent magnet film 8 is preferably at least 500 (Oe) (preferably at least 1000 (Oe)).

The thickness of the permanent magnet film 8 is preferably equal to or less than 150 nm (preferably equal to or less than 70 nm). A thickness of greater than 150 nm of the permanent magnet film 8 is not preferable because the mean surface roughness Ra of the orientation control film 3 becomes larger.

The permanent magnet film 8 is preferably provided with such a construction that exchange coupling between the permanent magnet film 8 and the soft magnetic layer 2 is formed and the magnet film 8 is magnetized in the radial direction of the substrate.

By providing the permanent magnet film 8, formation of extremely large magnetic domains in the soft magnetic layer 2 can be suppressed more effectively, and therefore the occurrence of spike noise due to magnetic domains can be prevented and the error rate during recording and read back can be sufficiently reduced.

To control the orientation of the permanent magnet film 8, an undercoat film made of a Cr alloy or a B2 structural material may be formed between a non-magnetic substrate 1 and a permanent magnet film 8.

In the manufacture of the magnetic recording medium having the construction described above, a soft magnetic layer 2 is formed on a substrate 1 by a sputtering method, a plating method or the like and, after subjecting the surface of the soft magnetic layer 2 to an oxidizing treatment, an orientation control film 3, an intermediate film 4 and a perpendicular magnetic recording film 5 are formed in sequence thereon by a sputtering method. Next, a protective film 6 is formed by a plasma CVD method, an ion beam method, a sputtering method or the like. Next, a lubricant film 7 is formed by a dipping method, a spin coating method or the like. In the method of manufacturing the above magnetic recording medium, the step of forming a permanent magnet film 8 between the substrate 1 and the soft magnetic layer 2 is included.

(Magnetic Read/Write Apparatus)

Figure 6A:
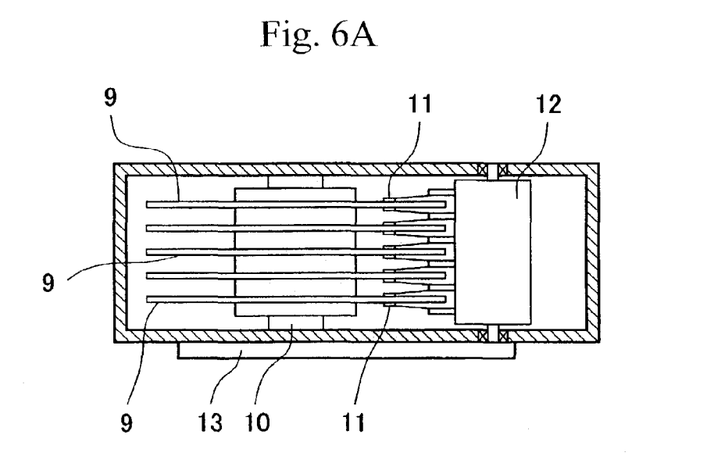
FIG. 6A is a schematic structural view showing an example of a magnetic read/write apparatus of the present invention.

FIG. 6A is a sectional structural view showing an example of the magnetic read/write apparatus according to the present invention. The magnetic read/write apparatus shown in this drawing comprises a plurality of magnetic recording media 9, a medium drive unit 10 that rotates the magnetic recording media 9, a magnetic head 11 that carries out recording and read back of the information on the magnetic recording media 9, a head drive unit 12, and a read/write signal processing system 13. The read back signal processing system 13 sends a recorded signal to the magnetic head 11 after processing the input data, and outputs the data after processing the read back signal from the magnetic head 11.

Examples of the magnetic head 11 include a single pole type head for perpendicular recording.

Figure 6B:
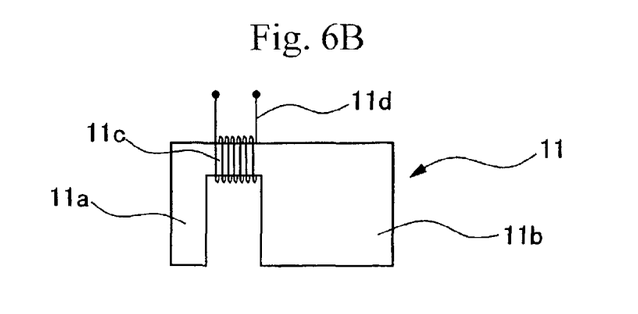
FIG. 6B shows a magnetic head available in the apparatus shown in FIG. 6A.

As shown in FIG. 6B, as the single pole type head, a single pole type head with a construction comprising a main magnetic pole 11a, an auxiliary magnetic pole 11b and a coil 11d provided at a connection unit 11c that connects these magnetic poles can be preferably used.

According to the magnetic read/write apparatus described above, since the magnetic recording medium 9 is used, the thermal stability and read/write characteristics can be enhanced. Therefore, it is made possible to prevent problems such as data being missing and to increase high recording density.

The operational effect of the present invention will now be clarified by way of examples. However, the present invention is not limited to the following examples.

EXAMPLE 1

A washed glass substrate (Ohara Co. of JAPAN; diameter: 2.5 inches) was accommodated in the film formation chamber of a DC magnetron sputtering apparatus (ANELVA of JAPAN, C-3010), and after expelling air in the film formation chamber up to an ultimate vacuum of $1 \times 10^{-5}$ Pa, a soft magnetic layer 2 (thickness: 180 nm) was formed on the glass substrate using a target comprising 89Co-4Zr-7Nb. Using a vibrating sample magnetometer (VSM), it was confirmed that Bs·t (T·nm), that is the product of the saturation magnetic density Bs (T) of this film and the thickness t (nm), is 200 (T·nm).

After heating the substrate to 240° C., an orientation control film 3 having a thickness of 8 nm was formed on the soft magnetic layer using a 50Co-50W target and an intermediate layer 4 having a thickness of 10 nm was formed thereon using a 58Co-25Cr-10Pt-7B target, and then a perpendicular magnetic recording film 5 having a thickness of 20 nm was formed thereon using a 64Co-17Cr-17Pt-2B target. In the sputtering step, a film was formed under a pressure of 0.6 Pa using argon as a process gas for forming a film. Using the vibrating sample magnetometer (VSM), it was confirmed that saturation magnetization Ms of the intermediate layer 4 (58Co-25Cr-10Pt-7B) was 120 (emu/cc). It was confirmed by the TEM image that the initial growth portion of the intermediate layer 4 (58Co-25Cr-10Pt-7B) was 0.5 nm.

Next, a protective film 6 having a thickness of 5 nm was formed by a CVD method.

Next, a lubrication film 7 made of perflubropolyether was formed by a dip coating method to obtain a magnetic recording medium. The results of read/write characteristics and thermal stability of this magnetic recording medium are shown in Table 1.

COMPARATIVE EXAMPLE 1

In the same manner as in Example 1, except that no intermediate film 4 was formed, a magnetic recording medium was manufactured.

EXAMPLES 2 TO 5

In the same manner as in Example 1, except for selecting Ms of the intermediate film 4 as shown in Table 1, magnetic recording media were manufactured (see Table 1).

COMPARATIVE EXAMPLES 2 TO 5

In the same manner as in Example 1, except for selecting Ms of the intermediate film 4 as shown in Table 1, magnetic recording media were manufactured (see Table 1).

With respect to magnetic recording media of these Examples and Comparative Example, read/write characteristics were evaluated. The evaluation was conducted using a read/write analyzer RWA1632 manufactured by GUZIK Co. of the U.S. and a spin stand S1701MP.

In the evaluation of read/write characteristics, the measurement was conducted at a recording frequency of 600 kFCI using a magnetic head wherein a single magnetic pole head is used at the writing portion and a GMR element is used at the read back portion.

The evaluation of the thermal stability was made by calculating the decrease rate (%/decade) of the output of the read back output after writing at a track recording density of 50 kFCI under the conditions of 70° C. one second after writing based on $(S_o-S) \times 100/(S_o \times 3)$. In this equation, So denotes the read back output when one second has passed after the signal recording onto the magnetic recording medium, and S denotes the read back output after 1000 seconds.

These test results are shown in Table 1.

TABLE 1

| | SOFT MAGNETIC LAYER | | ORIENTATION CONTROL FILM | | INTERMEDIATE FILM | | |
|---|---|---|---|---|---|---|---|
| | COMPOSITION (at %) | Bs · t (T · nm) | COMPOSITION (at %) | THICKNESS (nm) | COMPOSITION (at %) | THICKNESS (nm) | Ms (emu/cc) |
| EXAMPLE 1 | 89Co-4Zr-7Nb | 200 | CoW | 8 | 58Co-25Cr-10Pt-7B | 10 | 120 |
| EXAMPLE 2 | 89Co-4Zr-7Nb | 200 | CoW | 8 | 56Co-28Cr-10Pt-6B | 10 | 25 |
| EXAMPLE 3 | 89Co-4Zr-7Nb | 200 | CoW | 8 | 57Co-28Cr-10Pt-5B | 10 | 50 |
| EXAMPLE 4 | 89Co-4Zr-7Nb | 200 | CoW | 8 | 59Co-25Cr-10Pt-6B | 10 | 150 |
| EXAMPLE 5 | 89Co-4Zr-7Nb | 200 | CoW | 8 | 61Co-23Cr-10Pt-6B | 10 | 190 |
| COMPARATIVE EXAMPLE 1 | 89Co-4Zr-7Nb | 200 | CoW | 8 | *** | *** | *** |

TABLE 1-continued

| | | | | | | | |
|---|---|---|---|---|---|---|---|
| COMPARATIVE EXAMPLE 2 | 89Co-4Zr-7Nb | 200 | CoW | 8 | 60Co-40Cr | 10 | 0 |
| COMPARATIVE EXAMPLE 3 | 89Co-4Zr-7Nb | 200 | CoW | 8 | 43Co-40Cr-10Pt-7B | 10 | 0 |
| COMPARATIVE EXAMPLE 4 | 89Co-4Zr-7Nb | 200 | CoW | 8 | 54Co-30Cr-10Pt-6B | 10 | 15 |
| COMPARATIVE EXAMPLE 5 | 89Co-4Zr-7Nb | 200 | CoW | 8 | 63Co-21Cr-10Pt-6B | 10 | 220 |

| | FIRST PERPENDICULAR MAGNETIC RECORDING FILM | | READ/WRITE CHARACTERISTICS SNR (dB) | THERMAL STABILITY (%/DECADE) |
|---|---|---|---|---|
| | COMPOSITION (at %) | THICKNESS (nm) | | |
| EXAMPLE 1 | 64Co-17Cr-17Pt-2B | 20 | 20.8 | −0.6 |
| EXAMPLE 2 | 64Co-17Cr-17Pt-2B | 20 | 20.5 | −0.9 |
| EXAMPLE 3 | 64Co-17Cr-17Pt-2B | 20 | 20.6 | −0.7 |
| EXAMPLE 4 | 64Co-17Cr-17Pt-2B | 20 | 20.8 | −0.4 |
| EXAMPLE 5 | 64Co-17Cr-17Pt-2B | 20 | 20.2 | −0.5 |
| COMPARATIVE EXAMPLE 1 | 64Co-17Cr-17Pt-2B | 20 | 18.9 | −2.1 |
| COMPARATIVE EXAMPLE 2 | 64Co-17Cr-17Pt-2B | 20 | 19.7 | −1.7 |
| COMPARATIVE EXAMPLE 3 | 64Co-17Cr-17Pt-2B | 20 | 20.1 | −1.8 |
| COMPARATIVE EXAMPLE 4 | 64Co-17Cr-17Pt-2B | 20 | 20.2 | −1.5 |
| COMPARATIVE EXAMPLE 5 | 64Co-17Cr-17Pt-2B | 20 | 19.6 | −0.7 |

As is apparent from Table 1, in the Examples wherein Ms of the intermediate film is at least 20 (emu/cc) and equal to or less than 200 (emu/cc), both read/write characteristics and thermal stability could be improved.

EXAMPLES 6 TO 9

In the same manner as in Example 1, except for selecting the composition of the intermediate film 4 as shown in Table 2, magnetic recording media were manufactured (see Table 2).

characteristics and excellent thermal stability can be obtained. Also when the intermediate film 4 has the composition of CoCrPtB, particularly excellent read/write characteristics and excellent thermal stability can be obtained.

EXAMPLES 10 TO 15

In the same manner as in Example 1, except for selecting the thickness of the intermediate film 4 as shown in Table 3, magnetic recording media were manufactured (see Table 3).

TABLE 2

| | SOFT MAGNETIC LAYER | | ORIENTATION CONTROL FILM | | INTERMEDIATE FILM | | |
|---|---|---|---|---|---|---|---|
| | COMPOSITION (at %) | Bs · t (T · nm) | COMPOSITION (at %) | THICKNESS (nm) | COMPOSITION (at %) | THICKNESS (nm) | Ms (emu/cc) |
| EXAMPLE 1 | 89Co-4Zr-7Nb | 200 | CoW | 8 | 58Co-25Cr-10Pt-7B | 10 | 120 |
| EXAMPLE 6 | 89Co-4Zr-7Nb | 200 | CoW | 8 | 74Co-26Cr | 10 | 115 |
| EXAMPLE 7 | 89Co-4Zr-7Nb | 200 | CoW | 8 | 66Co-24Cr-10Ru | 10 | 120 |
| EXAMPLE 8 | 89Co-4Zr-7Nb | 200 | CoW | 8 | 59Co-27Cr-14Pt | 10 | 110 |
| EXAMPLE 9 | 89Co-4Zr-7Nb | 200 | CoW | 8 | 61Co-27Cr-6Pt-6B | 10 | 100 |

| | FIRST PERPENDICULAR MAGNETIC RECORDING FILM | | READ/WRITE CHARACTERISTICS SNR (dB) | THERMAL STABILITY (%/DECADE) |
|---|---|---|---|---|
| | COMPOSITION (at %) | THICKNESS (nm) | | |
| EXAMPLE 1 | 64Co-17Cr-17Pt-2B | 20 | 20.8 | −0.6 |
| EXAMPLE 6 | 64Co-17Cr-17Pt-2B | 20 | 20.2 | −0.7 |
| EXAMPLE 7 | 64Co-17Cr-17Pt-2B | 20 | 20.5 | −0.6 |
| EXAMPLE 8 | 64Co-17Cr-17Pt-2B | 20 | 20.4 | −0.7 |
| EXAMPLE 9 | 64Co-17Cr-17Pt-2B | 20 | 20.9 | −0.7 |

As is apparent from Table 2, when the intermediate film 4 is made of a Co alloy and Ms is at least 20 (emu/cc) or is equal to or less than 200 (emu/cc), excellent read/write With respect to magnetic recording media of these Examples, read/write characteristics were evaluated. These test results are shown in Table 3.

TABLE 3

| | SOFT MAGNETIC LAYER | | ORIENTATION CONTROL FILM | | INTERMEDIATE FILM | | |
|---|---|---|---|---|---|---|---|
| | COMPOSITION (at %) | Bs · t (T · nm) | COMPOSITION (at %) | THICKNESS (nm) | COMPOSITION (at %) | THICKNESS (nm) | Ms (emu/cc) |
| EXAMPLE 1 | 89Co-4Zr-7Nb | 200 | CoW | 8 | 58Co-25Cr-10Pt-7B | 10 | 120 |
| EXAMPLE 10 | 89Co-4Zr-7Nb | 200 | CoW | 8 | 58Co-25Cr-10Pt-7B | 2 | 120 |
| EXAMPLE 11 | 89Co-4Zr-7Nb | 200 | CoW | 8 | 58Co-25Cr-10Pt-7B | 3 | 120 |
| EXAMPLE 12 | 89Co-4Zr-7Nb | 200 | CoW | 8 | 58Co-25Cr-10Pt-7B | 18 | 120 |
| EXAMPLE 13 | 89Co-4Zr-7Nb | 200 | CoW | 8 | 58Co-25Cr-10Pt-7B | 28 | 120 |
| EXAMPLE 14 | 89Co-4Zr-7Nb | 200 | CoW | 8 | 58Co-25Cr-10Pt-7B | 1 | 120 |
| EXAMPLE 15 | 89Co-4Zr-7Nb | 200 | CoW | 8 | 58Co-25Cr-10Pt-7B | 35 | 120 |

| | FIRST PERPENDICULAR MAGNETIC RECORDING FILM | | READ/WRITE CHARACTERISTICS SNR (dB) | THERMAL STABILITY (%/DECADE) |
|---|---|---|---|---|
| | COMPOSITION (at %) | THICKNESS (nm) | | |
| EXAMPLE 1 | 64Co-17Cr-17Pt-2B | 20 | 20.8 | −0.6 |
| EXAMPLE 10 | 64Co-17Cr-17Pt-2B | 20 | 20.3 | −0.9 |
| EXAMPLE 11 | 64Co-17Cr-17Pt-2B | 20 | 20.6 | −0.7 |
| EXAMPLE 12 | 64Co-17Cr-17Pt-2B | 20 | 20.8 | −0.6 |
| EXAMPLE 13 | 64Co-17Cr-17Pt-2B | 20 | 20.2 | −0.8 |
| EXAMPLE 14 | 64Co-17Cr-17Pt-2B | 20 | 19.4 | −1.4 |
| EXAMPLE 15 | 64Co-17Cr-17Pt-2B | 20 | 18.6 | −1.4 |

As is apparent from Table 3, the magnetic recording media wherein the thickness of the intermediate film is at least 2 (nm) and equal to or less than 30 (nm) are excellent in read/write characteristics and thermal stability. The magnetic recording media wherein the thickness of the intermediate film is at least 3 (nm) and equal to or less than 20 (nm) are particularly excellent in these characteristics.

control film 3 as shown in Table 4, magnetic recording media were manufactured (see Table 4).

With respect to magnetic recording media of these Examples, read/write characteristics were evaluated. These test results are shown in Table 4.

TABLE 4

| | SOFT MAGNETIC LAYER | | ORIENTATION CONTROL FILM | | INTERMEDIATE FILM | | |
|---|---|---|---|---|---|---|---|
| | COMPOSITION (at %) | Bs · t (T · nm) | COMPOSITION (at %) | THICKNESS (nm) | COMPOSITION (at %) | THICKNESS (nm) | Ms (emu/cc) |
| EXAMPLE 1 | 89Co-4Zr-7Nb | 200 | CoW | 8 | 58Co-25Cr-10Pt-7B | 10 | 120 |
| EXAMPLE 16 | 89Co-4Zr-7Nb | 200 | CoW | 1 | 58Co-25Cr-10Pt-7B | 10 | 120 |
| EXAMPLE 17 | 89Co-4Zr-7Nb | 200 | CoW | 18 | 58Co-25Cr-10Pt-7B | 10 | 120 |
| EXAMPLE 18 | 89Co-4Zr-7Nb | 200 | FeTa | 8 | 58Co-25Cr-10Pt-7B | 10 | 120 |
| EXAMPLE 19 | 89Co-4Zr-7Nb | 200 | CoMo | 8 | 58Co-25Cr-10Pt-7B | 10 | 120 |
| EXAMPLE 20 | 89Co-4Zr-7Nb | 200 | FeMo | 8 | 58Co-25Cr-10Pt-7B | 10 | 120 |
| EXAMPLE 21 | 89Co-4Zr-7Nb | 200 | NiNb | 8 | 58Co-25Cr-10Pt-7B | 10 | 120 |
| EXAMPLE 22 | 89Co-4Zr-7Nb | 200 | Ru | 10 | 58Co-25Cr-10Pt-7B | 10 | 120 |

| | FIRST PERPENDICULAR MAGNETIC RECORDING FILM | | READ/WRITE CHARACTERISTICS SNR (dB) | THERMAL STABILITY (%/DECADE) |
|---|---|---|---|---|
| | COMPOSITION (at %) | THICKNESS (nm) | | |
| EXAMPLE 1 | 64Co-17Cr-17Pt-2B | 20 | 20.8 | −0.6 |
| EXAMPLE 16 | 64Co-17Cr-17Pt-2B | 20 | 20.6 | −0.7 |
| EXAMPLE 17 | 64Co-17Cr-17Pt-2B | 20 | 20.4 | −0.7 |
| EXAMPLE 18 | 64Co-17Cr-17Pt-2B | 20 | 20.7 | −0.6 |
| EXAMPLE 19 | 64Co-17Cr-17Pt-2B | 20 | 20.6 | −0.7 |
| EXAMPLE 20 | 64Co-17Cr-17Pt-2B | 20 | 20.5 | −0.8 |
| EXAMPLE 21 | 64Co-17Cr-17Pt-2B | 20 | 20.3 | −0.9 |
| EXAMPLE 22 | 64Co-17Cr-17Pt-2B | 20 | 20.1 | −1.0 |

EXAMPLES 16 TO 22

In the same manner as in Example 1, except for selecting the constituent material and the thickness of the orientation As is apparent from Table 4, the magnetic recording media wherein the orientation control film has an amorphous structure or a fine crystal structure are particularly excellent in read/write characteristics and thermal stability.

The invention claimed is:

1. A magnetic recording medium comprising:
   a non-magnetic substrate;
   at least a soft magnetic layer formed on the non-magnetic substrate directly or indirectly;
   an orientation control film that is formed on the soft magnetic layer and controls the orientation of a film provided directly thereabove;
   an intermediate film formed on the orientation control film;
   a perpendicular magnetic recording film that is formed on the intermediate film and of which an axis of easy magnetization is generally oriented perpendicularly to the non-magnetic substrate; and
   a protective film formed on the perpendicular magnetic recording film,
   wherein the intermediate film is made of CoCrPtB and has a saturation magnetization (Ms) of at least 20 (emu/cc) and equal to or less than 200 (emu/cc).

2. The magnetic recording medium according to claim 1, wherein the saturation magnetization Ms of the intermediate film is at least 50 (emu/cc) and equal to or less than 150 (emu/cc).

3. The magnetic recording medium according to claim 1, wherein the thickness of the intermediate film is at least 2 nm and equal to or less than 30 nm.

4. The magnetic recording medium according to claim 1, wherein a total amount of a Cr content and a B content of the intermediate film is at least 23 at % and equal to or less than 35 at %.

5. The magnetic recording medium according to claim 1, wherein a Cr content of the intermediate film is at least 20 at % and equal to or less than 34 at %.

6. The magnetic recording medium according to claim 1, wherein a thickness of an amorphous structure, as an initial growth portion of the intermediate film, is equal to or less than 1 nm.

7. The magnetic recording medium according to claim 1, wherein the orientation control film has an amorphous structure.

8. A method for manufacturing a magnetic recording medium, comprising:
   a step of forming at least a soft magnetic layer on a non-magnetic substrate directly or indirectly;
   a step of forming an orientation control film that controls the orientation of a film provided directly thereabove on the soft magnetic layer;
   a step of forming an intermediate film which is made of CoCrPtB on the orientation control film;
   a step of forming a perpendicular magnetic recording film on the intermediate film, of which the axis of easy magnetization is generally oriented perpendicularly to the non-magnetic substrate; and
   a step of forming a protective film on the perpendicular magnetic recording film,
   wherein conditions of forming the films are controlled so that a saturation magnetization Ms of the intermediate film is at least 20 (emu/cc) and equal to or less than 200 (emu/cc).

9. A magnetic read\write apparatus comprising:
   the magnetic recording medium of claim 1; and
   a single pole type head that records information on the magnetic recording medium and reads the information from the magnetic recording medium.

10. The magnetic recording medium according to claim 1, wherein the orientation control film comprises at least one alloy selected from the group consisting of Co alloy, Ni alloy, and Fe alloy.

11. The magnetic recording medium according to claim 1, wherein a permanent magnet film of which magnetization anisotropy is mainly oriented in an in-planar direction is provided between the non-magnetic substrate and the soft magnetic layer.

12. The magnetic recording medium according to claim 11, wherein an undercoat film made of a Cr alloy or a B2 structural material is formed between the non-magnetic substrate and the permanent magnet film.

13. A magnetic recording medium comprising:
   a non-magnetic substrate;
   at least a soft magnetic layer formed on the non-magnetic substrate directly or indirectly;
   an orientation control film that is formed on the soft magnetic layer and controls the orientation of a film provided directly thereabove;
   an intermediate film formed on the orientation control film;
   a perpendicular magnetic recording film that is formed on the intermediate film and of which an axis of easy magnetization is generally oriented perpendicularly to the non-magnetic substrate; and
   a protective film formed on the perpendicular magnetic recording film,
   wherein the intermediate film is made of a Co alloy and has a saturation magnetization (Ms) of at least 20 (emu/cc) and equal to or less than 200 (emu/cc), and
   the orientation control film comprises at least one alloy selected from the group consisting of Co alloy, Ni alloy, and Fe alloy, and has an amorphous structure.

14. The magnetic recording medium according to claim 13, wherein the saturation magnetization Ms of the intermediate film is at least 50 (emu/cc) and equal to or less than 150 (emu/cc).

15. The magnetic recording medium according to claim 13, wherein the thickness of the intermediate film is at least 2 nm and equal to or less than 30 nm.

16. The magnetic recording medium according to claim 13, wherein a total amount of a Cr content and a B content of the intermediate film is at least 23 at % and equal to or less than 35 at %.

17. The magnetic recording medium according to claim 13, wherein a Cr content of the intermediate film is at least 20 at % and equal to or less than 34 at %.

18. The magnetic recording medium according to claim 13, wherein the intermediate film has an initial growth portion and a thickness of the amorphous initial growth portion of the intermediate film is equal to or less than 1 nm.

19. The magnetic recording medium according to claim 13, wherein a permanent magnet film of which magnetization anisotropy is mainly oriented in an in-planar direction is provided between the non-magnetic substrate and the soft magnetic layer.

20. The magnetic recording medium according to claim 19, wherein an undercoat film made of a Cr alloy or a B2 structural material is formed between the non-magnetic substrate and the permanent magnet film.

21. A method for manufacturing a magnetic recording medium, comprising:
   a step of forming at least a soft magnetic layer on a non-magnetic substrate directly or indirectly;
   a step of forming an orientation control film that comprises at least one alloy selected from the group consisting of Co alloy, Ni alloy, and Fe alloy and has an amorphous structure and that controls the orientation of a film provided directly thereabove on the soft magnetic layer;

a step of forming an intermediate film which is made of a Co alloy on the orientation control film;

a step of forming a perpendicular magnetic recording film on the intermediate film, of which the axis of easy magnetization is generally oriented perpendicularly to the non-magnetic substrate; and a step of forming a protective film on the perpendicular magnetic recording film, wherein conditions of forming the films are controlled so that a saturation magnetization Ms of the intermediate film is at least 20 (emu/cc) and equal to or less than 200 (emu/cc).

22. A magnetic readlwrite apparatus comprising:

the magnetic recording medium of claim 13; and a single pole type head that records information on the magnetic recording medium and reads the information from the magnetic recording medium.

* * * * *